United States Patent
Hirst et al.

(10) Patent No.: US 6,173,411 B1
(45) Date of Patent: Jan. 9, 2001

(54) METHOD AND SYSTEM FOR FAULT-TOLERANT NETWORK CONNECTION SWITCHOVER

(75) Inventors: Michael D. Hirst, Lakeville; Alan A. Gale, Carver; Gene A. Cummings, Sherborn, all of MA (US)

(73) Assignee: The Foxboro Company, Foxboro, MA (US)

( * ) Notice: Under 35 U.S.C. 154(b), the term of this patent shall be extended for 0 days.

(21) Appl. No.: 09/059,896

(22) Filed: Apr. 14, 1998

Related U.S. Application Data

(60) Provisional application No. 60/062,681, filed on Oct. 22, 1997, and provisional application No. 60/062,984, filed on Oct. 21, 1997.

(51) Int. Cl.$^7$ .................................................. G06F 11/00
(52) U.S. Cl. ................................................ 714/4; 709/223
(58) Field of Search .................................. 714/2, 3, 4, 7, 714/18, 47, 51; 709/223, 238, 239, 240, 241, 242

(56) References Cited

U.S. PATENT DOCUMENTS

| | | | |
|---|---|---|---|
| 4,692,918 | * 9/1987 | Elliott et al. | 370/85 |
| 4,710,926 | 12/1987 | Brown et al. | 371/9 |
| 4,787,082 | 11/1988 | Delaney et al. | 370/85 |
| 4,964,120 | 10/1990 | Mostashari | 370/16 |
| 5,153,874 | 10/1992 | Kohno | 370/13 |
| 5,159,685 | * 10/1992 | Kung | 714/712 |
| 5,218,600 | 6/1993 | Schenkyr et al. | 370/16 |
| 5,276,440 | 1/1994 | Jolissaint et al. | 340/825.02 |
| 5,329,521 | 7/1994 | Walsh et al. | 370/16 |
| 5,337,320 | * 8/1994 | Kung | 714/712 |
| 5,341,496 | 8/1994 | Middledorp et al. | 395/575 |
| 5,390,326 | 2/1995 | Shah | 395/575 |
| 5,485,465 | 1/1996 | Liu et al. | 395/182.02 |
| 5,485,576 | 1/1996 | Fee et al. | 395/185.09 |
| 5,493,650 | 2/1996 | Reinke et al. | 395/200.12 |
| 5,508,997 | 4/1996 | Katou | 370/16 |
| 5,508,998 | 4/1996 | Sha et al. | 370/16.1 |
| 5,586,112 | 12/1996 | Tabata | 370/221 |
| 5,661,719 | 8/1997 | Townsend et al. | 370/216 |
| 5,675,723 | 10/1997 | Ekrot et al. | 395/182.02 |
| 5,680,437 | 10/1997 | Segal | 379/10 |
| 5,987,521 | * 11/1999 | Arrowood et al. | 709/239 |

OTHER PUBLICATIONS

Stevens, et al. "TCP/IP Illustrated, vol. 1. The Protocols," *TCP/IP Illustrated* vol. 1, XP–002106390, pp. 85–96.

* cited by examiner

Primary Examiner—Robert W. Beausoliel, Jr.
Assistant Examiner—Pierre Eddy Elisca
(74) Attorney, Agent, or Firm—David Barron; Sean Detweiler; J. J. Morris

(57) ABSTRACT

A computer is connected to redundant network switches by primary and secondary connections, respectively. Test messages are sent across each connection to the attached switches. A break in a connection, or a faulty connection, is detected upon a failed response to one of the test messages. In response to this failure, traffic is routed across the remaining good connection. To facilitate fast protocol rerouting, a test message is sent across the now active connection bound for the switch connected to the failed connection. This message therefor traverses both switches causing each to learn the new routing. Rerouting is therefor accomplished quickly.

19 Claims, 9 Drawing Sheets

METHOD AND SYSTEM FOR FAULT-TOLERANT NETWORK CONNECTION SWITCHOVER

CROSS REFERENCING TO RELATED PATENTS

This patent application is related to co-pending patent applications: "Fast Re-Mapping For Fault Tolerant Connections" Ser. No. 60/062,681, Filed: Oct. 20, 1997; and "Fast Re-Mapping For Fault Tolerant Connections", Ser. No. 60/062,984, Filed: Oct. 21, 1997 both of which are incorporated by reference herein in their entireties.

TECHNICAL FIELD

The present invention relates, in general, to fault-tolerant computing. More specifically, the present invention relates to methods and systems for quickly switching between network connections.

BACKGROUND OF THE INVENTION

The reliability of computer based applications continues to be an important consideration. Moreover, the distribution of applications across multiple computers, connected by a network, only complicates overall system reliability issues. One critical concern is the reliability of the network connecting the multiple computers. Accordingly, fault-tolerant networks have emerged as a solution to insure computer connection reliability.

In many applications, the connection between a single computer and a network is a critical point of failure. That is, often a computer is connected to a network by a single physical connection. Thus, if that connection were to break, all connectivity to and from the particular computer would be lost. Multiple connections from a single computer to a network have therefore been implemented, but not without problems.

Turning to FIG. 1, a diagram of a computer 11 connected to a network 21 is shown. Computer 11 includes a network interface, for example, a fast-Ethernet interface 13. A connection 30 links fast-Ethernet interface 13 with a fault-tolerant transceiver 15. Fault tolerant transceiver 15 establishes a connection between connection 30 and one of two connections 29 and 31 to respective fast-Ethernet switches 19 and 17 (these "switches" as used herein are SNMP managed network Switches). Switches 17 and 19 are connected in a fault-tolerant matter to network 21 through connections 23 and 25.

Fault-tolerant transceiver 15 may be purchased from a number of vendors including, for example, a Digi brand, model MIL-240TX redundant port selector; while fast-Ethernet switches 17 and 19 may also be purchased from a number of vendors and may include, for example, a Cisco brand, model 5000 series fast-Ethernet switch.

Operationally, traffic normally passes from fast-Ethernet interface 13 through fault-tolerant transceiver 15, and over a primary connection 29 or 31 to respective switch 17 or 19 and on to network 21. The other of connections 29 and 31 remains inactive. Network 21 and switches 17 and 19 maintain routing information that directs traffic bound for computer 11 through the above-described primary route.

In the event of a network connection failure, fault-tolerant transceiver 15 will switch traffic to the other of connection 29 and 31. For example, if the primary connection was 31, and connection 31 broke, fault-tolerant transceiver 15 would switch traffic to connection 29.

When, for example, traffic from computer 11 begins passing over its new, backup connection 29 through switch 19, network routing has to be reconstructed such that traffic bound for computer 11 is routed by the network to the port on switch 19 that connection 29 is attached to. Previously, the routing directed this traffic to the port on switch 17 that connection 31 was attached to.

Several problems arise from the above-described operation. First, the rebuilding of network routing to accommodate passing traffic over the back-up connection may take an extended period of time. This time may range from seconds to minutes, depending upon factors including network equipment design and where the fault occurs. Second, fault-tolerant transceiver 15 is only sensitive to a loss of the physical receive signal on the wire pair from the switches (e.g., 17 and 19) to the transceivers. It is not sensitive to a break in the separate wire pair from the transceiver to the switch. Also, it is sensitive only to the signal from the switch to which it is directly attached and does not test the backup link for latent failures which would prevent a successful recovery. This technique also fails to test the switches themselves.

Another example of a previous technique for connecting a computer 11 to a network 21 is shown in FIG. 2. Network switches 17 and 19 and their connection to each other and network 21 is similar to that shown in FIG. 1. However, in this configuration, each of switches (e.g., 17 and 19) connects to its own fast-Ethernet interface (e.g., 13 and 14) within computer 11.

Operationally, only one of interfaces 13 and 14 is maintained active at any time. When physical signal is lost to the active interface, use of the interface with the failed connection is ceased, and connectivity begins through the other, backup interface. The backup interface assumes the addressing of the primary interface and begins communications. Unfortunately, this technique shares the same deficiencies with that depicted in FIG. 1. Rerouting can take an extended period of time, and the only failure mode that may be detected is that of a hard, physical connection failure from the switch to the transceiver.

The present invention is directed toward solutions to the above-identified problems.

SUMMARY OF THE INVENTION

Briefly summarized, in a first aspect, the present invention includes a method for managing network routing in a system including a first node, a second node and a third node. The first node has primary and secondary connections to the second and third nodes, respectively. Also, the second and third nodes are connected by a network.

The method includes periodically communicating between the first and the second or third node over at least the primary connection. A status of network connectivity between the communicating nodes is thereby determined.

If the network connectivity determined is unacceptable, roles of the primary and secondary connections are swapped to establish new primary and secondary connections. A message is then sent with an origin address of the first node to the second node over the new primary connection. The origin address of this message facilitates the network nodes learning about routing to the first node over the new primary connection.

As an enhancement, the first node may include a first port connected to the primary connection and a second port connected to the secondary connection. The first and second ports have first and second network addresses, respectively; and the first node has a system network address. The periodic communication may be transmitted from the first port of the first node with an origin address of the first port. Further, the origin address of the message sent if network connectivity was unacceptable may be the system network address of the first node. Also, the periodic communication may be a ping message having the first network address of the first port as its origin address. This ping message may be destined for the second or third node.

If the ping message fails, another ping message may be sent from the second port to the other of the second and third nodes, not previously pinged. If this ping message is successful, the method may include swapping the roles of the primary and secondary connections and pinging the second node over the new primary link.

As yet another enhancement, the status of the connection between the second port and the other of the second and third nodes to which the previous ping was sent is determined.

In another aspect, the present invention includes a system for implementing methods corresponding to those described hereandabove. In this embodiment a link manager may be attached to the computer and may provide connectivity between the computer and the primary and secondary connections. As implementation options, the link manager may be, for example, integral with the computer (e.g., on a main board of the computer), on an expansion board of the computer, or external to the computer. Also, the computer may be an operator workstation or a controller such as, for example, an industrial or environmental controller.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

In accordance with the present invention, depicted herein are techniques for establishing a fault-tolerant connection to a network that overcome the disadvantages of prior techniques discussed hereinabove. That is, according to the present invention, connectivity problems are quickly detected, and upon assumption of an alternate (back-up) connection, network reroute times are mitigated.

Figure 1:
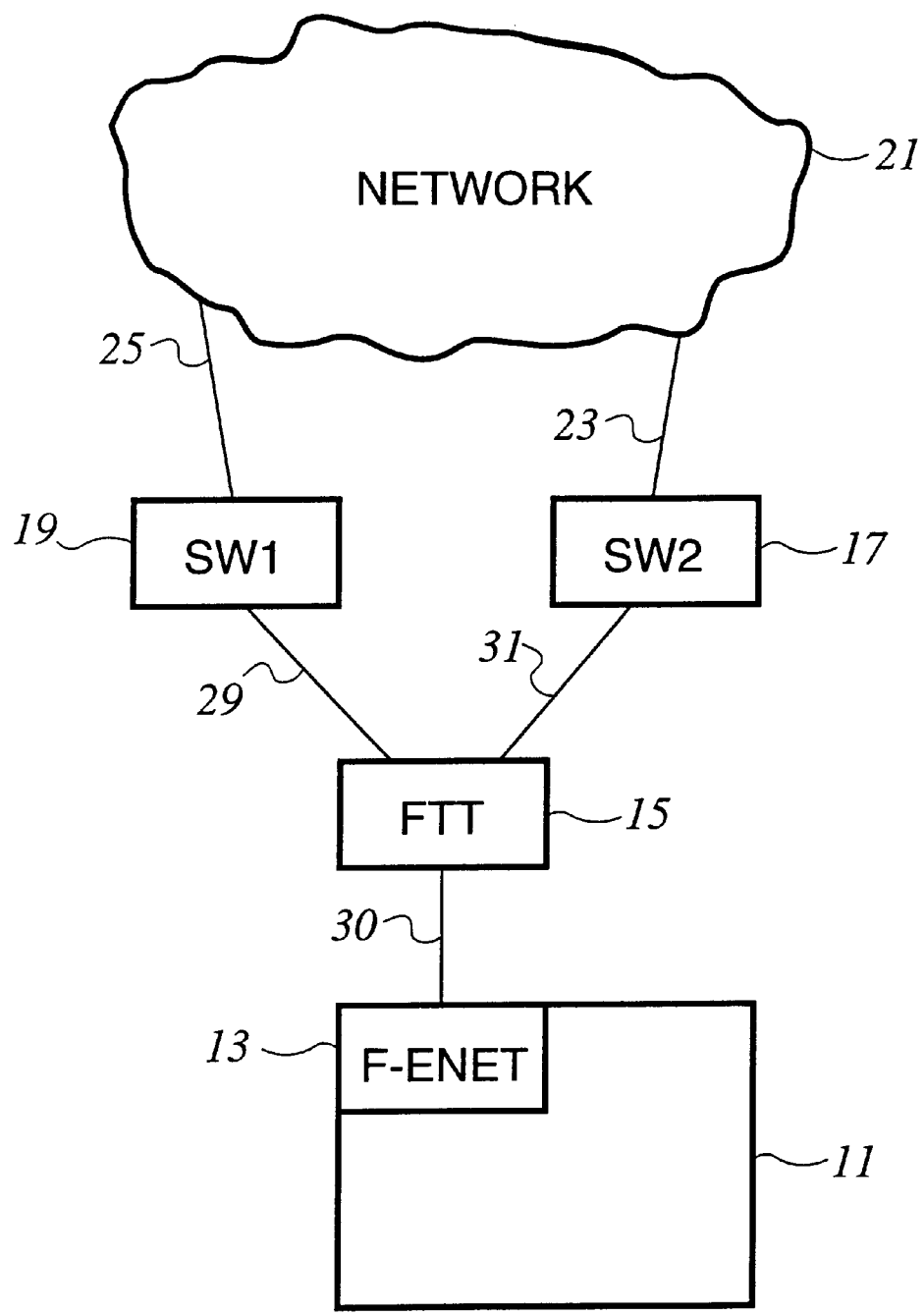
FIGS. 1–2 depict prior art systems for managing fault-tolerant network connections.
Figure 2:
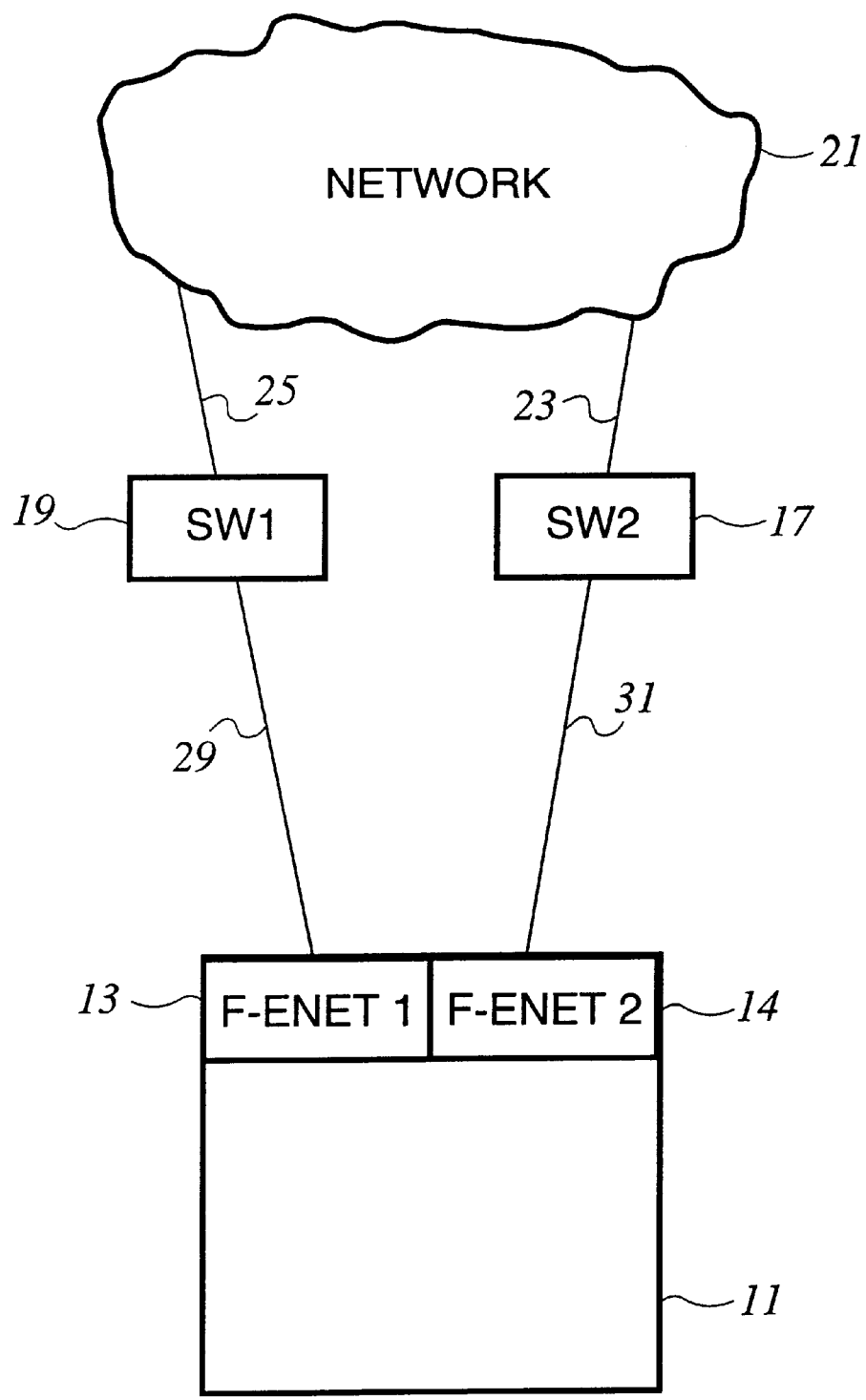
Figure 3:
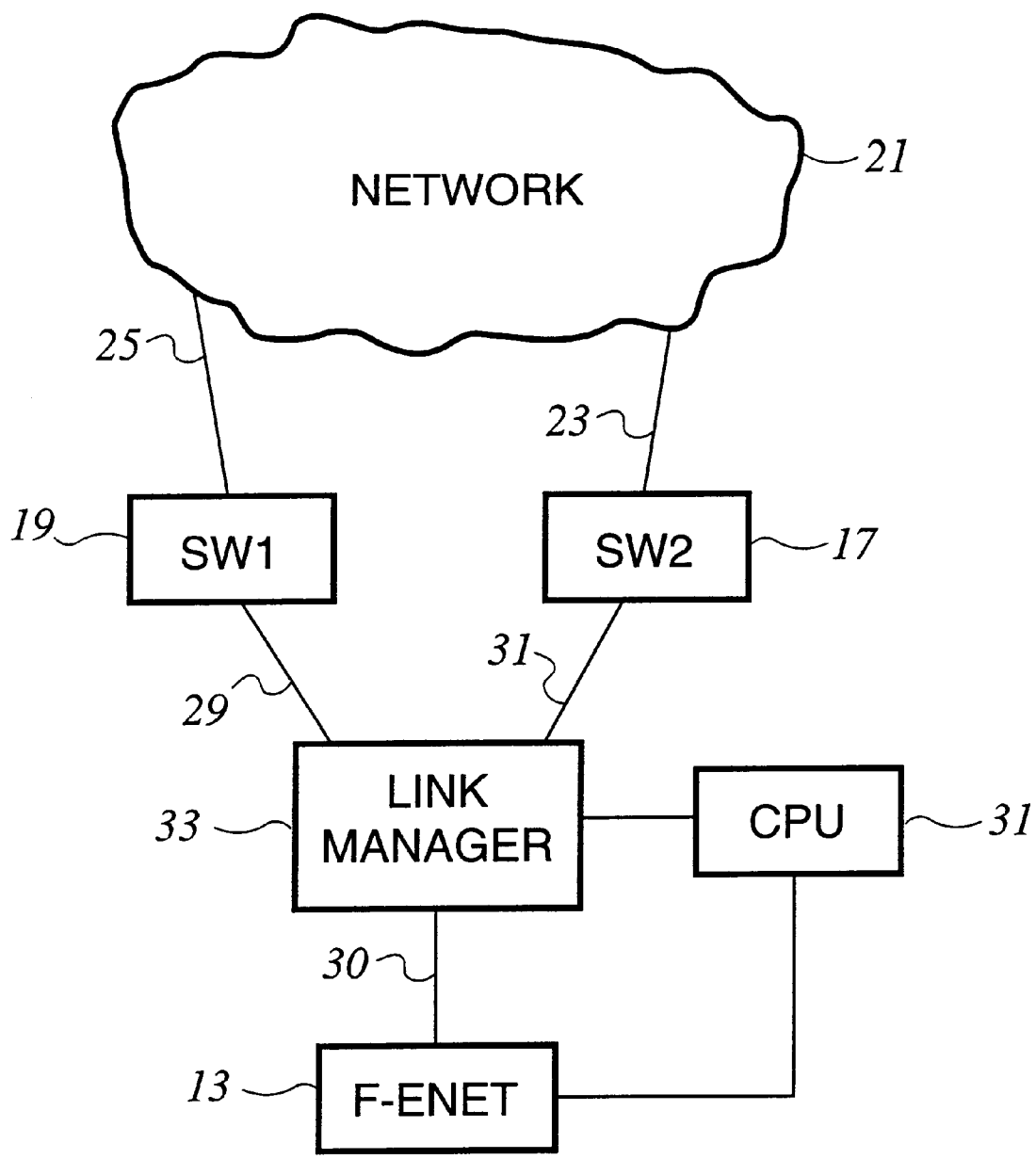
FIG. 3 depicts a fault-tolerant network connection topology in accordance with one embodiment of the present invention.

Turning to FIG. 3, a fast-Ethernet interface 13 is connected to both a link manager 33 and a CPU 31. The topological relationship between fast-Ethernet interface 13, link manager 33 and CPU 31 will vary with implementation requirements. Several example topologies are discussed hereinbelow in regard to FIGS. 9–11; however, many other topologies will become apparent to those of ordinary skill in the art in view of the disclosure herein.

The techniques disclosed herein are not limited to fast-Ethernet technology. Other networking technologies may be subjected to the techniques disclosed herein, such as, for example, conventional Ethernet technology.

Link manager 33 is connected to both fast-Ethernet interface 13 and CPU 31. The connection to fast-Ethernet interface 13 is that which would be normally used for network connectivity. The connection of link manager 33 to CPU 31 is for configuration and control purposes. In one implementation example, link manager 33 and fast-Ethernet interface 13 may each be PCI cards within a personal computer architecture. In this example, their connections to CPU 31 are by way of the PCI bus. A cable may connect fast-Ethernet interface 13 and link manager 33.

Two network connections 29 and 31 (for example, fast-Ethernet connections) couple link manager 33 to switches 19 and 17, respectively. Connections 23 and 25 couple switches 17 and 19 to network 21, which connects them to each other.

Figure 4:
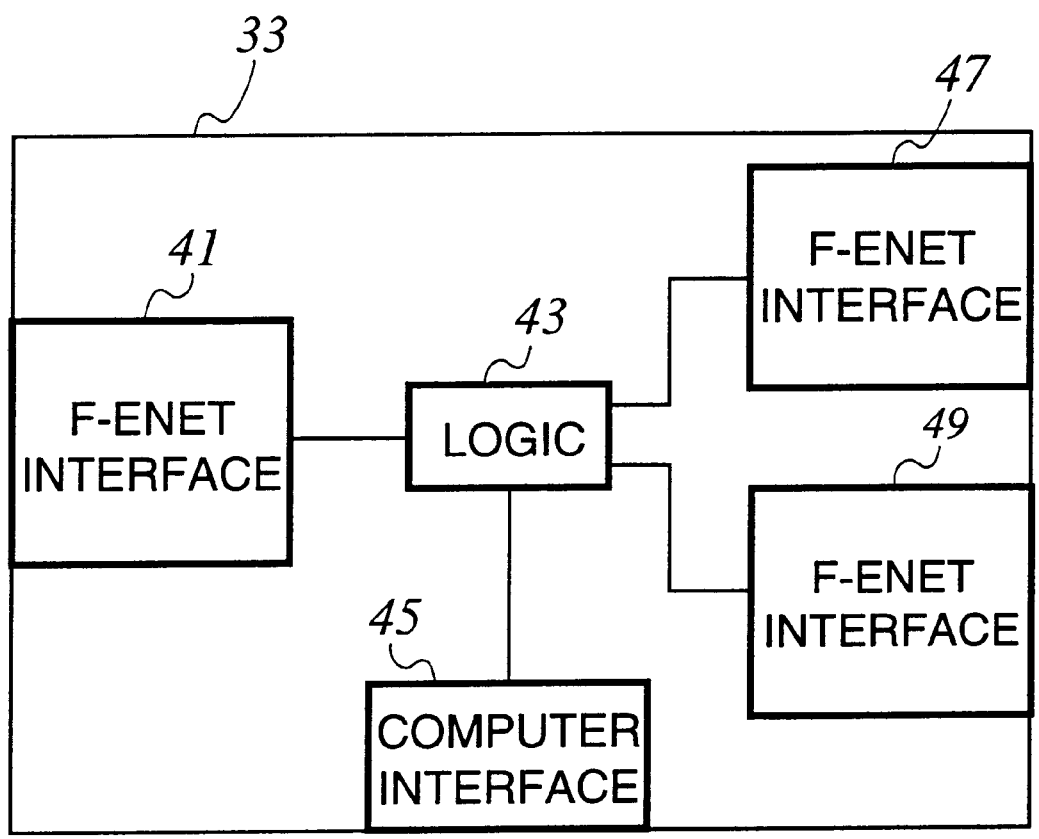
FIG. 4 is a functional block diagram of the link manager of FIG. 3 in accordance with one embodiment of the present invention.

Link manager 33 is more specifically depicted in FIG. 4. A fast-Ethernet interface 41 provides connectivity (e.g., PCI bus interface) with an attached host computer. Computer interface 45 also attaches to the host computer and facilitates configuration and control of link manager 33. Fast-Ethernet interfaces 47 and 49 provide redundant network connectivity. Lastly, logic 43 interconnects the above-described elements. In a preferred embodiment, logic 43 is implemented as an ASIC; however, the particular implementation of logic 43 will vary with product requirements. In other implementation examples, logic 43 could be implemented using a programmed processor, a field programmable gate array, or any other form of logic that may be configured to perform the tasks disclosed therefor herein.

To briefly summarize, the techniques of the present invention send test messages across each connection of the link manager to the attached switches. A break in a connection, or faulty connection, is detected upon a failed response to one of the test messages. In response to this failure, traffic is routed across the remaining good connection. To facilitate fast protocol rerouting, a test message is sent across the now active connection bound for the switch connected to the inactive connection. This message traverses both switches causing each to learn the new routing. Rerouting is therefore accomplished quickly.

Figure 5:
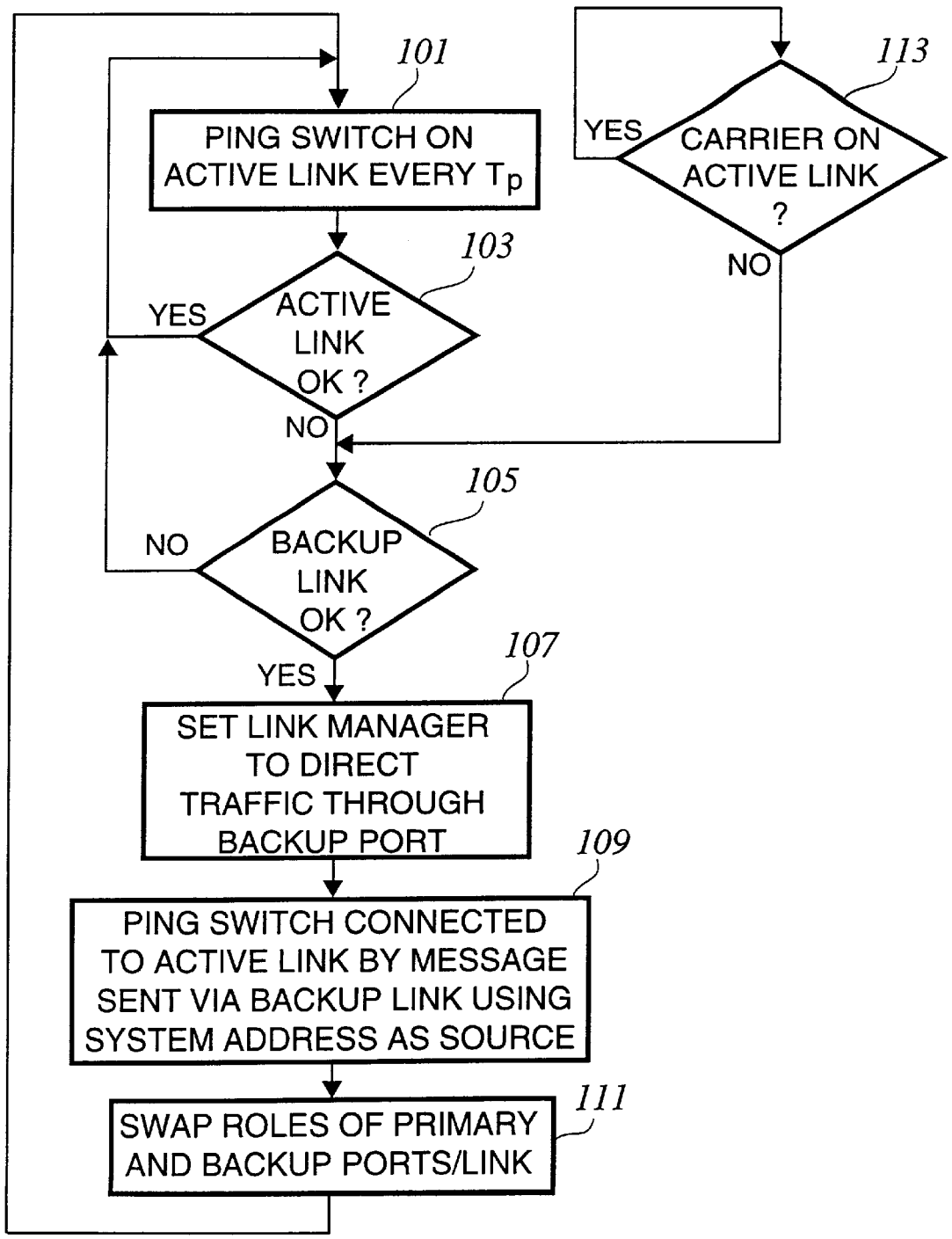
FIGS. 5–7 are flow-diagrams of techniques in accordance with one embodiment of the present invention.
Figure 6:
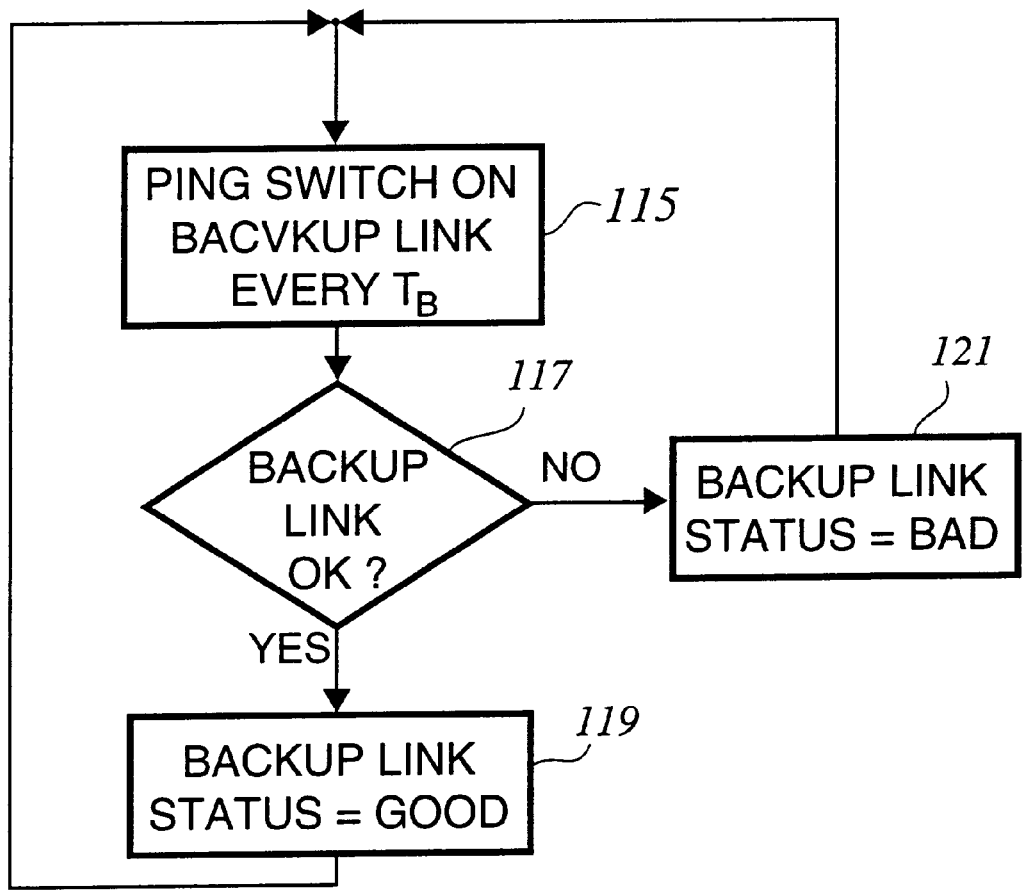

More particularly, according to one-embodiment, FIGS. 5–6 depict flow-diagrams of operational techniques in accordance with one embodiment the present invention. To begin, the link manager pings a switch connected to the primary, active connection, every $T_p$ seconds, STEP 101. The ping message contains a source address unique to the link manager port currently associated with the active connection. If the active connection is ok, pinging thereof continues, STEP 101. Also, a check is regularly performed to detect a loss of receive signal on the active connection interface, STEP 113.

If either pinging fails on the active connection, or carrier has been lost, a test is performed to check whether the back-up connection status is good, STEP 105. If the back-up connection is unavailable, no further action can be taken and pinging of the primary connection continues in anticipation of either restoration of the active connection or availability of the back-up connection. Also under this condition, the host computer may be notified such that it may take appropriate action, such as, e.g., to enter a fail-safe condition.

If the back-up connection status is good, the link manager is configured to direct traffic through the back-up connection, STEP 107. Further, a ping message is sent from the link manager, through the switch connected to the back-up connection and to the switch connected to the primary, failed, connection, STEP 109. This ping message contains a source address of the computer connected to the link manager. As a result, the switches connected to the primary and back-up connections are made aware of the new routing to the computer. This facilitates the immediate routing of traffic bound for the computer over the back-up, secondary, connection. Lastly, the roles of active and backup connections are swapped and the process iterates, STEP 111.

Turning to FIG. 6, a flow-diagram depicts a technique for maintaining the status of the back-up connection. A ping is send over the back-up connection to its respective switch every $T_p$ seconds, STEP 115. The ping message contains a source address unique to the link manager port currently associated with the backup connection. If the back-up connection is good, that is, the ping is responded to timely, STEP 117; then the back-up connection status is set to good, STEP 119. If the response to the ping message is not timely received, the back-up connection status is set to bad, STEP 121 (A maintenance alert may also be generated. The invention facilitates detecting latent faults in unused paths and repairing them within the MTBF of a primary fault.) In either case, the processor iterates to the pinging step, STEP 115.

Figure 7:
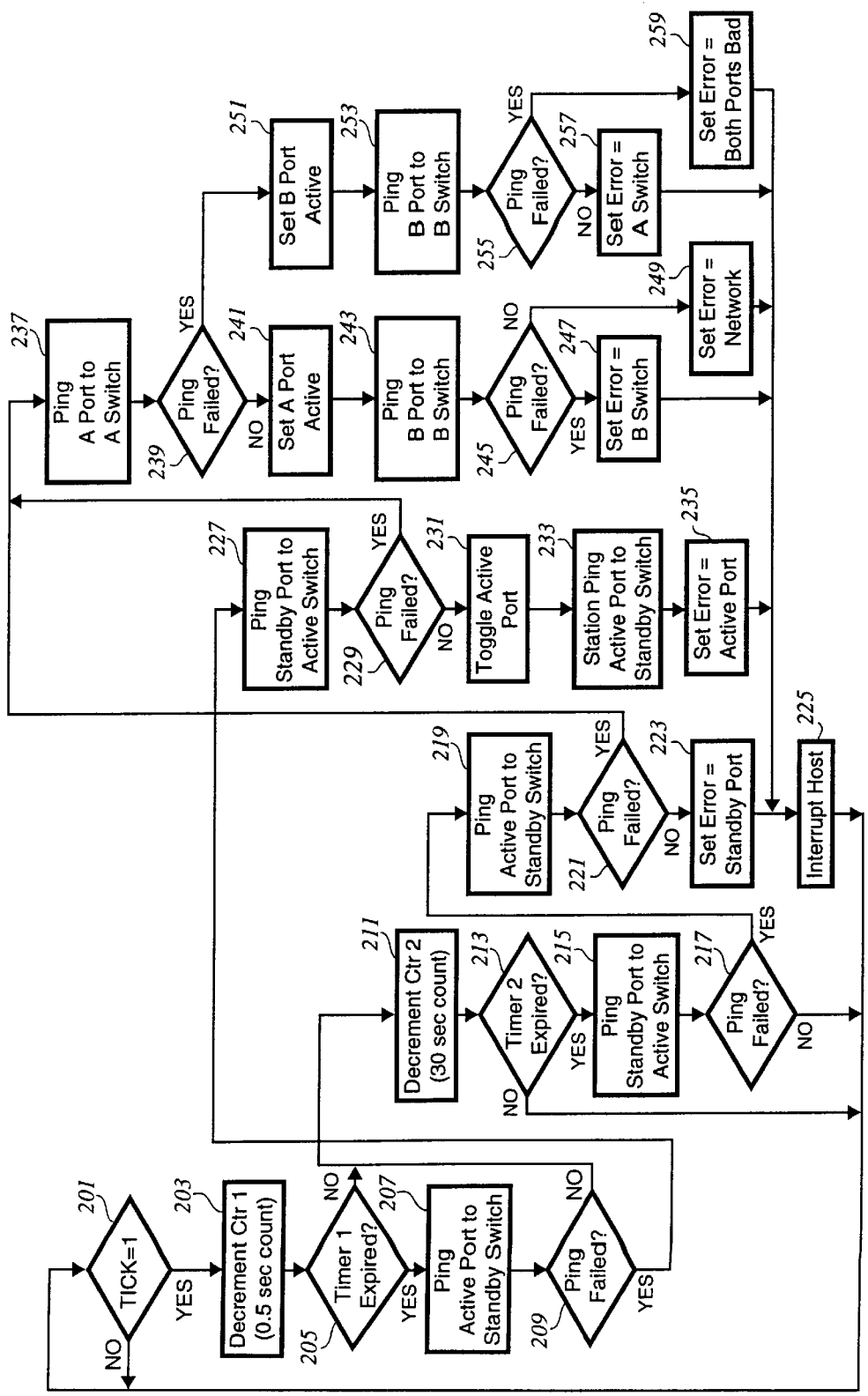

According to the above-described embodiments ping messages are sent from the link manager, across each connection to the switch attached thereto. Failure of these ping messages will indicate failure of the link the ping message was sent across. In accordance with the embodiment of FIG. 7 described below, ping messages are sent across each link, but are bound for the switch connected to the other connection. Thus, the ping message must traverse one switch to get to the destination switch, traversing both the connection from the link manager to the immediately attached switch and across the connection between the switches. Thus, the technique described below can localize faults in the connections between the link manager and each switch and the connection between the switches. Further, this embodiment contains example information on how timed message transmission can be implemented using a common clock.

As described above, the pings sent from each port have a unique source address for that particular port. However, to facilitate fast rerouting, the final ping, once the port roles are swapped uses the source address of the attached computer system.

To begin, a clock tick is awaited, STEP 201. Clock ticks are used as the basis for timing operations described herein. If a clock tick has not occurred, no action is taken. However, if a clock tick has occurred a first counter is decremented, STEP 203. This first counter is designed to expire, on a 0.5 second basis (of course, this time can be adjusted for particular application requirements).

If the first counter expired, indicating that the 0.5 second period has elapsed, a ping message is sent from the active port to the standby switch using the address of the active port, STEPS 205, 207. If the ping is successful, STEP 209, a second counter with a 30 second interval is decremented, STEP 211. The second counter decrement is also performed if the first counter decrement did not result in the 0.5 second time period expiring, STEP 205. If the second counter has not expired, STEP 213, then the process iterates awaiting a next clock tick, STEP 201. If the second counter has expired, a ping is sent from the standby port to the active switch using the standby port's address, STEP 215. If the ping was successful, STEP 217 then the process iterates awaiting another clock tick, STEP 201.

If the ping from the active port to the standby switch failed, STEP 209, a ping is sent from the standby port to the active switch, STEP 227. If this ping is successful, STEP 229, then the roles of the active and standby ports and switches are reversed, STEP 231, and a ping is sent from the now active port to the now standby switch using the address of the computer station, STEP 233. This ping facilitates the switches learning the new path to the computer thus correcting routing information. Furthermore, the old active port is determined to be in error, STEP 235.

Turning back to STEP 215, if the ping from the standby port to the active switch failed (STEP 217) a ping is sent from the active port to the standby switch, STEP 219. If this ping fails, there is an error associated with the standby port, STEP 223.

Turning back to STEP 227, a ping was sent from the standby port to the active switch. If this ping failed, then the current error must be associated with either the switches, the network between the switches or both ports may be bad. Therefore, for the following steps, it is most helpful to refer to the ports and switches as the "A port", "A switch", "B port" and "B switch", wherein the A port is directly connected to the A switch and B port is directly connected to the B switch. The notion of which port is currently active and which port is currently backup is not significant to the following steps.

Again, if the ping from the standby port to the active switch, STEPS 227, 229, failed then a ping is sent from the A port to the A switch, STEP 237. If this ping is successful, STEP 239, then the A port is set as the active port, STEP 241. A ping is then sent from the B port to the B switch, STEP 243. If this ping failed, STEP 245, then the error is associated with B switch, STEP 247; however, if the ping was successful, then the error is associated with the network, STEP 249.

If the ping from the A port to the A switch, STEP 237, failed, STEP 239, then the B port is set as active, STEP 251. A ping is then sent from the B port to the B switch, STEP 253. If this ping failed, then an error is associated with both ports, STEP 259; however, if the ping was successful, STEP 255, then the error is associated with the A switch, STEP 257.

In each of the above steps, once the error is determined and set (STEPS 223, 235, 247, 249, 257, and 259), an interrupt is sent to the host processor (STEP 255) for providing notification of the change in network configuration.

The techniques of the present invention may be implemented in different topologies. As examples, several of these topologies are depicted in FIGS. 8–11.

In each of the examples, the computer depicted may be, for example, a workstation, an embedded processor, a controller, (e.g., industrial or environmental) or other computer type.

Figure 8:
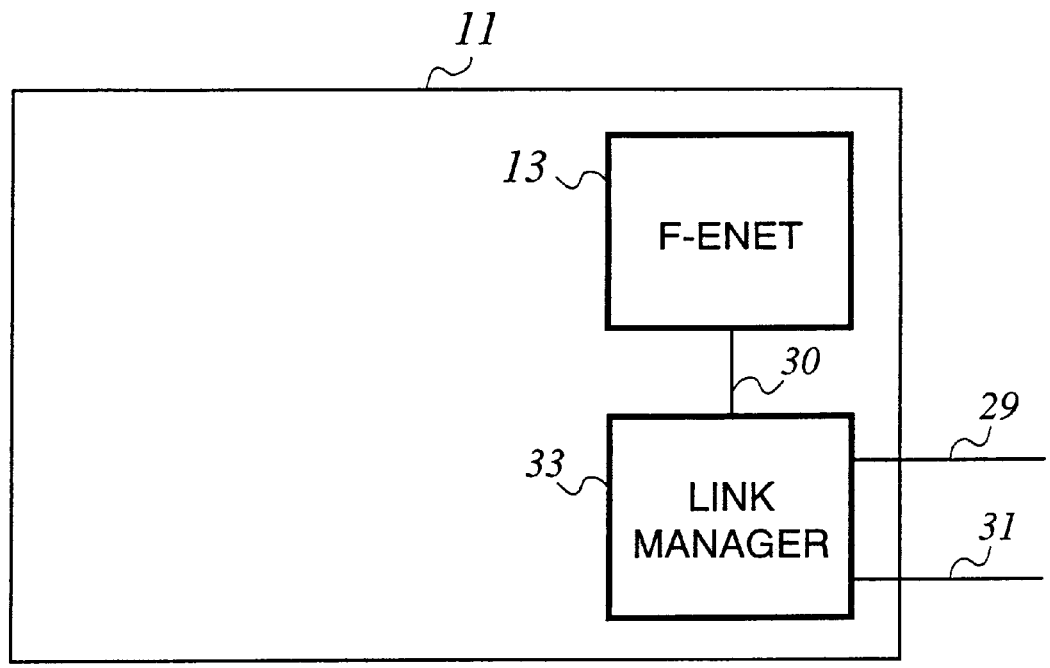
FIGS. 8–11 depict several topologies in conformance with the techniques of the present invention.

Beginning with FIG. 8, a computer 11 is depicted and contains fast-Ethernet interface 13 and link manager 33 connected by cable 30. Connections 29 and 31 couple the system to a network. The particular implementation and use of computer 11 will vary. In one example, computer 11 is a PCI bus-based computer and fast Ethernet interface 13 and link manager 33 are PCI interface cards. In another embodiment, all circuitry may be on a common board (e.g., the system motherboard).

Figure 9:
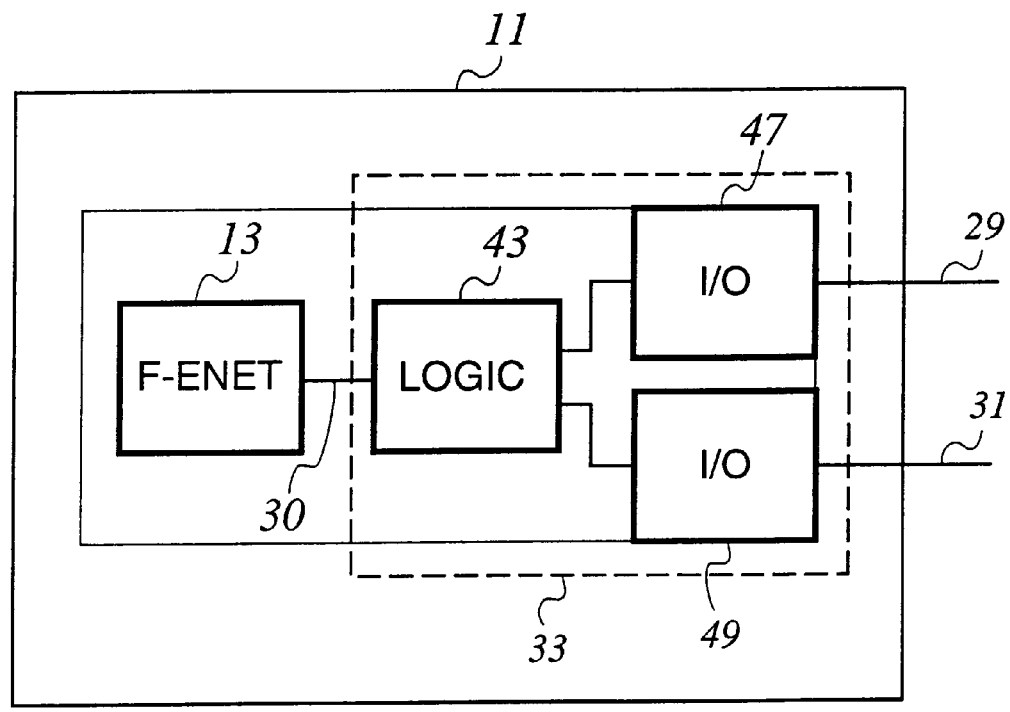

In FIG. 9, the functions of link manager 33 and fast-Ethernet interface 13 have been integrated onto a single interface card. As one example, this card may interface with its host computer using a PCI bus.

Figure 10:
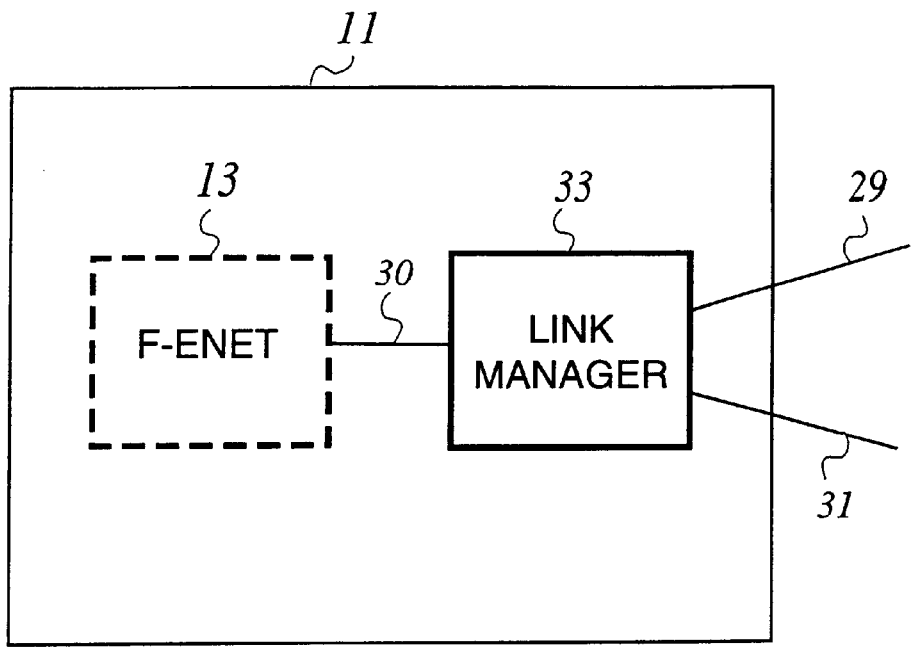

In FIG. 10, fast-Ethernet interface 13 is incorporated on a main board (e.g., a motherboard) of computer 11. Link manager 33 is a peripheral (e.g., PCI) interface card.

Figure 11:
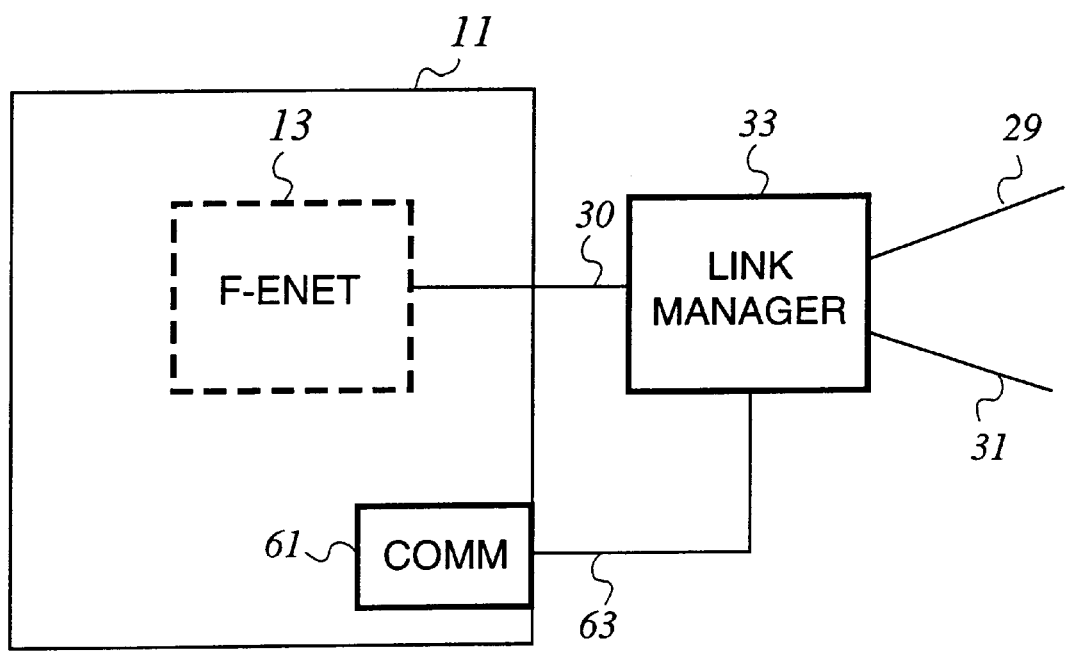

In FIG. 11, fast-Ethernet interface 13 may be incorporated on a main board of computer 11 or as a separate interface card. Link manager 33 is disposed external to computer 11 and is connected thereto by connections 30 and 63. Connection 63 is particularly used for command and control of link manager 33 and interfaces with computer 11 through a communications port 61 (e.g., a serial or parallel port).

A variety of techniques are available for implementing the techniques described herein. The present invention is not meant to be limitive of such implementation, as many options are available to those of ordinary skill in the art and will be apparent in view of the disclosure herein. Implementations may take form of software, hardware, and combinations of both. Dedicated logic, programmable logic, and programmable processors may be used in the implementation of techniques disclosed herein. One particular implementation example using programmable logic to implement a simple instruction set capable of implementing the techniques described herein is described in detail in Appendix A, "HDS 5608-Dual Switched Ethernet Interface, Revision 1.1" attached hereto and incorporated by reference herein in its entirety.

While the invention has been described in detail herein, in accordance with certain preferred embodiments thereof, many modifications and changes thereto can be affected by those skilled in the art. Accordingly, is intended by the appended claims to cover all such modifications and changes as fall within the true spirit and scope of the invention.

We claim:

1. A method for managing network routing in a system including a first node, a second node, and a third node, wherein said first node has a primary connection to said second node and a secondary connection to said third node, wherein said second node and said third node are connected by a network, and wherein said method includes:
   (a) periodically communicating between said first node and one of said second node and said third node over at least said primary connection and thereby determining a status of network connectivity between said first node and said one of said second node and third node; and
   (b) if said network connectivity status determined in said step (a) is unacceptable, swapping roles of said primary and said secondary connections to establish new primary and secondary connections and sending a message with an origin address of said first node to said second node over said new primary network connection, wherein said origin address of said message facilitates said network nodes learning about routing to said first node over said new primary connection.

2. The method of claim 1, wherein said first node includes a first port connected to said primary connection and a second port connected to said secondary connection, said first port having a first network address, said second port having a second network address and said first node having a system network address, wherein said periodic communication is transmitted from said first port of said first node with an origin address of said first port.

3. The method of claim 2, wherein said origin address of said sending said message of said step (b) comprises said system network address of said first node.

4. The method of claim 3, wherein said periodic communication between said first node and one of said second node and said third node comprises a ping message having said first network address of said first port as an origin address of said ping message.

5. The method of claim 4, wherein said ping message has a destination of said second node.

6. The method of claim 4, wherein said ping message has a destination of said third node.

7. The method of claim 4, wherein if said ping fails, a ping is sent from said second port to the other of said second node and said third node.

8. The method of claim 7, wherein if said ping from said second port to said other of said second node and said third node is successful, said method includes performing said swapping roles of said primary and secondary connections and said pinging of said second node over said new primary link of said step (c).

9. The method of claim 2, further comprising sending a ping message from said second port, with an origin address thereof, to the other of said second node and said third node to determine a status of network connectivity thereto.

10. A method for managing network routing in a system including a computer, a first network switch, and a second network switch, said first and second network switches being network connected, wherein said computer has an active connection to said first network switch and a backup connection to said second network switch, said method including:
   (a) periodically pinging said second network switch by transmitting a ping message bound for said second network switch over said active connection, said ping having an address of a port of said computer connected to said active connection; and
   (b) if said ping fails, and said backup connection is available, swapping roles of said active and backup connections to establish new active and backup connections and sending a ping with an origin address of said computer system to said first network switch over said new active connection, wherein said origin address of said ping facilitates said network nodes learning about routing to said computer over said new active connection, said address of said computer system being different than said address of said port.

11. A system for managing network routing including a first node, a second node, and a third node, wherein said first node has a primary connection to said second node and a secondary connection to said third node, said system including:
   (a) means for periodically communicating between said first node and one of said second node and said third node over at least said primary connection and determining a status of network connectivity between said first node and said one of said second node and third node thereby;
   (b) means for determining if said network connectivity status determined in said step (a) is unacceptable, and if so, for swapping roles of said primary and said secondary connections to establish new primary and secondary connections and for sending a message with an origin address of said first node to said second node over said new primary network connection, wherein said origin address of said message facilitates said network nodes learning about routing to said first node over said new primary connection.

12. The system of claim 11, wherein said first node comprises a computer.

13. The system of claim 12, further including a link manager attached to said computer, said link manager providing connectivity between said computer and said primary and secondary connections.

14. The system of claim 13, wherein said link manager is integral with said computer.

15. The system of claim 14, wherein said link manager is on a main board of said computer.

16. The system of claim 13, wherein said link manager is on an expansion board of said computer.

17. The system of claim 13, wherein said link manager is external to said computer.

18. The system of claim 12, wherein said computer comprises an operator workstation.

19. The system of claim 12, wherein said computer comprises one of an industrial controller and an environmental controller.

* * * * *